May 3, 1927.
A. K. SMITH ET AL
1,627,068
METHOD OF TREATING BRINE
Filed Sept. 29, 1923
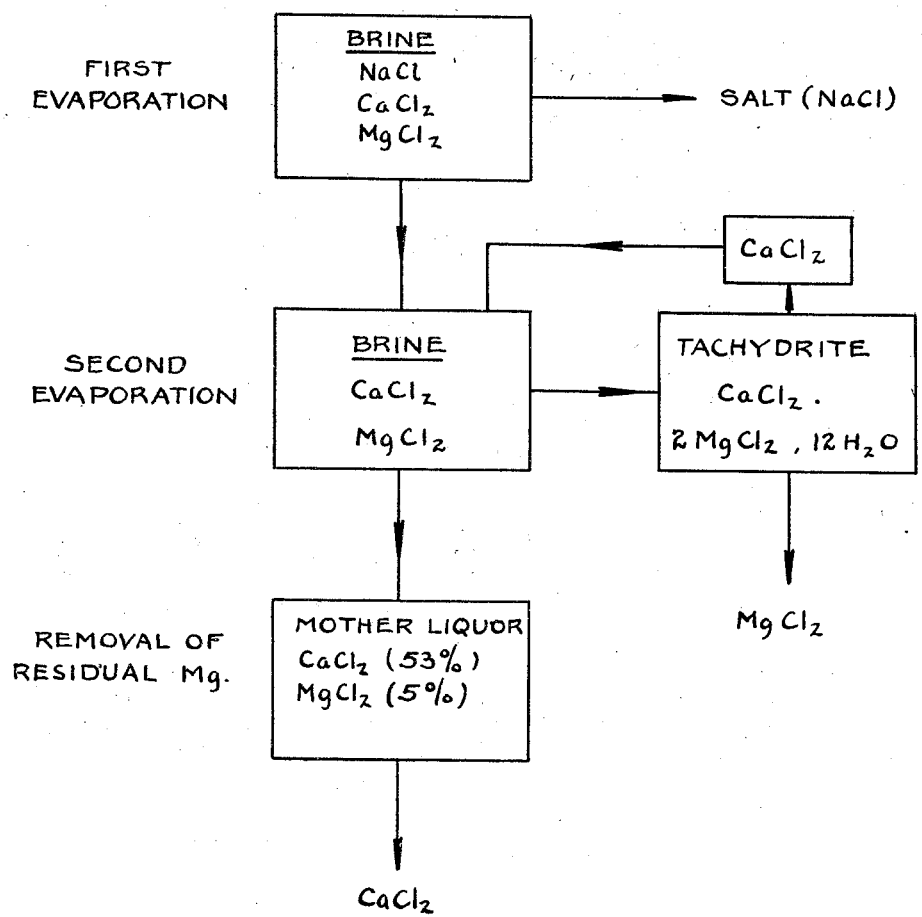
INVENTORS
Albert Kelvin Smith and
Carl F. Prutton.
BY
Fay, Oberlin & Fay
ATTORNEYS Patented May 3, 1927.

1,627,068

UNITED STATES PATENT OFFICE.

ALBERT KELVIN SMITH, OF MIDLAND, MICHIGAN, AND CARL F. PRUTTON, OF EAST CLEVELAND, OHIO, ASSIGNORS TO THE DOW CHEMICAL COMPANY, OF MIDLAND, MICHIGAN, A CORPORATION OF MICHIGAN.

METHOD OF TREATING BRINE.

Application filed September 29, 1923. Serial No. 665,737.

The present improved method of treating brine has regard more particularly to the treatment of natural brines, such as are found, for example, in the Midland field in Michigan, which regularly contain calcium and magnesium chlorides in addition to sodium chloride. Still more particularly, such method is designed to be applied to any brine wherein the weight of magnesium chloride is not less than 9.5 per cent of the weight of the calcium chloride present in the brine, both figured as anhydrous salts. The object of the invention is to provide a simple and expeditious method or process for separating the magnesium and the calcium chlorides from such a brine or any similar brine if one be found to exist, even if sodium chloride is not included therein.

To the accomplishment of the foregoing and related ends the invention then consists of the steps hereinafter fully described and particularly pointed out in the claims, the annexed drawing and the following description setting forth in detail one approved mode of carrying out the invention, such disclosed mode constituting, however, but one of the several ways in which the principle of the invention may be used.

In said annexed drawings:—

The single figure there appearing is in the form of a flow sheet showing in proper sequence the principal steps involved in our improved method or process.

In the case of brine from the Midland field, which contains, in addition to the hereinbefore mentioned constituents, traces of iron and also small quantities of certain bromides, a preliminary step for the removal of such iron will be desirably employed, as described, for example, in U. S. Patent, No. 1,386,244, to H. H. Dow, dated August 2, 1921; and the bromides may likewise be recovered as a preliminary step in the purification of the brine, although such elimination of the bromides is not essential.

In its broader aspect, the process in hand may be regarded as one for the separation of magnesium chloride from calcium chloride where they are found together in solution in the proportions hereinbefore indicated. The process is based upon the fact that from such a solution a double salt of calcium and magnesium, apparently the one known as tachydrite ($CaCl_2.2MgCl_2.12H_2O$) may be caused to crystallize out by evaporation under properly controlled conditions of pressure and temperature. From this double salt the calcium chloride may then in turn be removed by proper treatment, leaving the magnesium chloride behind in crystalline form, whereby the desired separation is effected. Other incidental steps are involved in the process, such as the removal of the magnesium chloride from the liquor remaining after removal of the tachydrite crystals.

The removal of the sodium chloride, where this is found present in the brine, is accomplished by the well known means of concentration. Such sodium chloride will substantially all crystallize out when the gravity of the liquor has reached approximately 40° Baumé. In the case of the Midland brine, the liquor at this point will have approximately a composition of 11 per cent magnesium chloride and 33 per cent calcium chloride.

Such residual brine is thereupon further evaporated, preferably by being placed in another evaporator from that wherein the sodium chloride was salted out, the temperature being desirably held at all times below 100° C. and such evaporation being conducted under reduced pressure. Under this temperature condition, as evaporation is continued the crystals of tachydrite will separate and can be removed from the mother liquor in the evaporator either continuously or intermittently as preferred until such mother liquor has the approximate composition of 53 per cent calcium chloride and 5 per cent magnesium chloride.

At this point the crystals of calcium chloride ($CaCl_2.2H_2O$) will start coming out and further evaporation will accordingly not be effective for the purpose in hand. The tachydrite crystals are conveniently separated from the mother liquor by passing the latter with such crystals through a suitable centrifugal machine, the liquor being returned to the main body and further evaporation continued until the final stage of such evaporation has been reached. Such tachydrite crystals together with the adherent mother liquor contain approximately 25 per cent calcium and 32 per cent magnesium chloride, and the next step consists in the separation of these chlorides. This is accomplished by mixing the tachydrite crystals with about 25 per cent of water by weight and agitating the same in the form of a thick slurry for approximately an hour at a temperature which should not fall below 22° C., nor rise above 50° C. Under these conditions the water will cause the calcium chloride of the tachydrite to dissolve and leave crystals, and adhering mother liquor, containing 42 per cent magnesium chloride and 5 per cent calcium chloride, the remainder being water. These crystals are separated from the calcium chloride solution by means of a centrifugal machine or by other means. The solution of calcium chloride will also contain a certain percentage of magnesium chloride and such solution is returned to the previously described evaporation step wherein tachydrite is formed.

The purification of the magnesium chloride crystals obtained as above may be accomplished in various ways. Thus, such crystals may be simply washed with water or magnesium chloride solution. In such case the water from one washing is used to perform the preliminary washing of the raw crystals and such number of washings may be employed in series as may be found necessary to produce pure magnesium chloride with minimum amount of water. The raw crystals may also be purified by dissolving them completely in hot water and cooling them to a temperature below 115° C., when the magnesium chloride will crystallize out in the hexa-hydrate form. Again, the raw crystals may be purified by dissolving them completely and evaporating under vacuum at a temperature below 115° C. The raw crystals may also be melted and evaporated under atmospheric pressure until the boiling point of the solution is above 160° C., this mixture being then cooled and filtered at a temperature above 115° C. In this last mentioned method, which forms the subject matter of our divisional application, filed June 16, 1925, Serial No. 37,465, the calcium chloride is separated as tachydrite and the purified magnesium chloride is in the liquor. The same results, moreover, can obviously be accomplished under reduced pressure such that the boiling point of a solution having the desired composition will fall above 115° C.

The calcium chloride may also be removed from such raw magnesium chloride crystals by dissolving the same in water and then precipitating the calcium as an insoluble compound, such as the sulfate, sulfite, or carbonate, by using the corresponding magnesium salt. This last method of purification is equally well adapted for use in separating the calcium chloride from the tachydrite, in the first instance, or may be employed at any intermediate stage of such separation to complete the removal of the calcium chloride.

The mother liquor remaining after removal of the tachydrite is also treated to separate the magnesium chloride from the relatively larger amount of calcium chloride remaining therein. One method of accomplishing this is to dilute such liquor with a small amount of water and add to it slaked lime, care being taken that the specific gravity of the liquor after the addition of the lime does not exceed 45° Baumé. As a matter of practice, the water which will ordinarily accompany the slaked lime if the latter is added in the form of a slurry will be sufficient to dilute such liquor to the proper gravity. The pure calcium chloride liquor may thereupon be separated from the magnesium hydrate by filtration.

As an alternative method of removing the small percentage of magnesium chloride from the mother liquor, such liquor may be evaporated, the temperature being maintained at a point between 120 and 165° C, whereupon a double salt of calcium-magnesium chloride, having the composition $MgCl_2.2CaCl_2.6H_2O$, separates out as an insoluble salt and may be removed from the mother liquor by means of a centrifugal machine or filter.

In the alternative steps involving the purification of the raw magnesium chloride crystal residue from the tachydrite, any resulting solution having a consequential amount of calcium chloride will be returned to the evaporator wherein tachydrite crystals are formed as aforesaid. As a further refinement in the process, the first crystals of tachydrite that are removed from this stage of the separation may be returned to the initial evaporation whereby sodium chloride is crystallized out. This results in returning to such step some additional sodium chloride which comes down with these first crystals of tachydrite, thus effecting a maximum removal of sodium chloride from the calcium and magnesium chlorides.

Other modes of applying the principle of our invention may be employed instead of the one explained, change being made as regards the method herein disclosed, provided the step or steps stated by any of the following claims or the equivalent of such step or steps be employed.

We therefore particularly point out and distinctly claim as our invention:

1. In a method of treating a brine of the character described, the steps which consist in evaporating such brine to crystallize out the sodium chloride and evaporating the residual brine containing calcium and magnesium chlorides to crystallize out the latter in the form of tachydrite, and leave a mother liquor having a higher proportion of calcium chloride to magnesium chloride than the original brine.

2. In a method of treating a brine of the character described, the steps which consist in evaporating such brine to crystallize out the sodium chloride and evaporating the residual brine containing calcium and magnesium chlorides to crystallize out the latter in the form of tachydrite, and leave a mother liquor having a higher proportion of calcium chloride to magnesium chloride than the original brine, the temperature being held at all times below 100° C. during the last mentioned step.

3. In a method of treating a brine of the character described, the steps which consist in evaporating such brine to crystallize out the sodium chloride and evaporating the residual brine containing calcium and magnesium chlorides to crystallize out the latter in the form of tachydrite, and leave a mother liquor having a higher proportion of calcium chloride to magnesium chloride than the original brine, and returning to the initial evaporation step the tachydrite crystals first formed as a result of the second evaporation.

4. In a method of treating a brine of the character described, the steps which consist in evaporating such brine to crystallize out the sodium chloride, evaporating the residual brine containing calcium and magnesium chlorides to crystallize out the latter in the form of tachydrite and leave a mother liquor having a higher proportion of calcium chloride to magnesium chloride than the original brine, dissolving the calcium chloride from such tachydrite, and separating the resulting solution from the crystal residue.

5. In a method of treating a brine of the character described, the steps which consist in evaporating such brine to crystallize out the sodium chloride, evaporating the residual brine containing calcium and magnesium chlorides to crystallize out the latter in the form of tachydrite and leave a mother liquor having a higher proportion of calcium chloride to magnesium chloride than the original brine, agitating such tachydrite with water in amount approximately sufficient to dissolve the calcium chloride constituent, and separating the resulting solution from the magnesium chloride crystal residue.

6. In a method of treating a brine of the character described, the steps which consist in evaporating such brine to crystallize out the sodium chloride, evaporating the residual brine containing calcium and magnesium chlorides to crystallize out the latter in the form of tachydrite and leave a mother liquor having a higher proportion of calcium chloride to magnesium chloride than the original brine agitating such tachydrite with approximately one-fourth of its weight of water at a temperature between 22° and 50° C., whereby the calcium chloride constituent is dissolved, separating the resulting solution from the magnesium chloride crystal residue.

7. In a method of treating a brine of the character described, the steps which consist in evaporating such brine to crystallize out the sodium chloride, evaporating the residual brine containing calcium and magnesium chlorides to crystallize out the latter in the form of tachydrite and leave a mother liquor having a higher proportion of calcium chloride to magnesium chloride than the original brine, dissolving the calcium chloride from such tachydrite, separating the resulting solution from the magnesium chloride crystal residue, and then purifying such crystals of any included calcium chloride.

8. In a method of treating a brine of the character described, the steps which consist in evaporating such brine to crystallize out the sodium chloride, evaporating the residual brine containing calcium and magnesium chlorides to crystallize out the latter in the form of tachydrite and leave a mother liquor having a higher proportion of calcium chloride to magnesium chloride than the original brine, dissolving the calcium chloride from such tachydrite, separating the resulting solution from the magnesium chloride crystal residue, and then washing such crystals to remove any included calcium chloride.

9. In a method of treating a brine of the character described, the steps which consist in evaporating such brine to crystallize out the sodium chloride, evaporating the residual brine containing calcium and magnesium chlorides to crystallize out the latter in the form of tachydrite and leave a mother liquor having a higher proportion of calcium chloride than the original brine, dissolving the calcium chloride from such tachydrite, separating the resulting solution from the magnesium chloride crystal residue, washing such crystals to remove any included calcium chloride, and returning the wash water to the second step.

10. In a method of treating a brine of the character described, the steps which consist in evaporating such brine to crystallize out the sodium chloride, evaporating the residual brine containing calcium and magnesium chlorides to crystallize out the latter in the form of tachydrite and leave a mother liquor having a higher proportion of calcium chloride than the original brine, dissolving the calcium chloride from such tachydrite, separating the resulting solution from the magnesium chloride crystal residue, and returning the resulting calcium chloride solution containing some magnesium chloride through the second step.

11. In a method of treating a brine of the character described, the steps which consist in evaporating such brine to crystallize out the sodium chloride, evaporating the residual brine containing calcium and magnesium chloride under reduced pressure at a temperature below 100° C., whereby such chlorides crystallize out in the form of tachydrite and a mother liquor relatively high in calcium chloride is left, dissolving the calcium chloride from such tachydrite, and separating the resulting solution from the magnesium chloride crystal residue.

12. In a method of treating a brine of the character described, the steps which consist in evaporating such brine to crystallize out the sodium chloride, evaporating the residual brine containing calcium and magnesium chlorides under reduced pressure at a temperature below 100° C., whereby such chlorides crystallize out in the form of tachydrite and a mother liquor relatively high in calcium chloride is left, removing such tachydrite approximately as formed, dissolving the calcium chloride from such tachydrite, and separating the resulting solution from the magnesium chloride crystal residue.

13. In a method of treating a brine of the character described, the steps which consist in evaporating such brine to crystallize out the sodium chloride, evaporating the residual brine containing calcium and magnesium chlorides under reduced pressure at a temperature below 100° C., whereby such chlorides crystallize out in the form of tachydrite and a mother liquor relatively high in calcium chloride is left, removing such tachydrite approximately as formed, until the mother liquor has the approximate composition of 53 per cent calcium chloride and 5 per cent magnesium chloride, dissolving the calcium chloride from such tachydrite, and separating the resulting solution from the magnesium chloride crystal residue.

14. In the separation of calcium chloride from tachydrite, the step which consists in agitating the latter with a limited quantity of water at regulated temperature to dissolve the calcium chloride constituent and leave magnesium chloride crystals behind.

15. In the separation of calcium chloride from tachydrite, the step which consists in agitating the latter with approximately one-fourth of its weight of water at regulated temperature to dissolve the calcium chloride constituent and leave magnesium chloride crystals behind.

16. In the separation of calcium chloride from tachydrite, the step which consists in agitating the latter with approximately one-fourth of its weight of water at a temperature between 22° and 50° C., whereby the calcium chloride constituent is dissolved and magnesium chloride crystals are left behind.

17. In a method of separating calcium chloride from magnesium chloride in solution together, the step which consists in evaporating such solution to crystallize out said chlorides in the form of tachydrite and leave a mother liquor having a higher proportion of calcium chloride to magnesium chloride than the original solution, the temperature being held at all times below 100° C. during such evaporation.

18. In a method of separating calcium chloride from magnesium chloride in solution together, the steps which consist in evaporating such solution to crystallize out said chlorides in the form of tachydrite and leave a mother liquor having a higher proportion of calcium chloride to magnesium chloride than the original solution, the temperature being held at all times below 100° C. during such evaporation, and removing the tachydrite approximately as formed.

19. In a method of separating calcium chloride from magnesium chloride in solution together, the steps which consist in evaporating such solution to crystallize out the latter in the form of tachydrite and leave a mother liquor having a higher proportion of calcium chloride to magnesium chloride than the original solution, and then dissolving the calcium chloride from such tachydrite, leaving magnesium chloride crystals behind.

20. In a method of separating calcium chloride from magnesium chloride in solution together, the steps which consist in evaporating such solution to crystallize out the latter in the form of tachydrite and leave a mother liquor having a higher proportion of calcium chloride to magnesium chloride than the original solution, dissolving the calcium chloride from such tachydrite, leaving magnesium chloride crystals behind, then purifying such crystals of any included calcium chloride and returning the latter to the aforesaid evaporation step.

Signed by me this 15th day of September, 1923.

ALBERT KELVIN SMITH.

Signed by me this 26th day of September, 1923.

CARL F. PRUTTON.